United States Patent [19]

Nardi et al.

[11] 4,122,245
[45] Oct. 24, 1978

[54] ALCL$_3$/1-ALKYL PYRIDINIUM CHLORIDE ROOM TEMPERATURE ELECTROLYTES

[75] Inventors: John C. Nardi, Colorado Springs; Charles L. Hussey, USAF Academy; Lowell A. King, Colorado Springs, all of Colo.

[73] Assignee: The United States of America as represented by the Secretary of the Air Force, Washington, D.C.

[21] Appl. No.: 826,223

[22] Filed: Aug. 19, 1977

[51] Int. Cl.$^2$ ............................................. H01M 6/16
[52] U.S. Cl. ................................... 429/194; 429/200; 429/198
[58] Field of Search ............... 429/194, 199, 188, 200, 429/198

[56] References Cited

U.S. PATENT DOCUMENTS

| | | | |
|---|---|---|---|
| 3,073,884 | 1/1963 | Pinkerton | 429/199 |
| 3,423,242 | 1/1969 | Meyers et al. | 429/194 |
| 3,542,602 | 11/1970 | Gabano | 429/194 |
| 3,562,017 | 2/1971 | Lyall | 429/194 |
| 3,819,415 | 6/1974 | Benderly et al. | 429/188 |

OTHER PUBLICATIONS

Koch et al, Electroinitiated Friedel–Crafts Transalkylations in a Room–Temperature Molten Salt Medium, J. Am. Chem. Soc., 98. 5277(1976).

*Primary Examiner*—Donald L. Walton
*Attorney, Agent, or Firm*—Joseph E. Rusz; William J. O'Brien

[57] ABSTRACT

A room temperature electrolyte comprising a fused salt mixture of aluminum trichloride and an alkyl pyridinium chloride wherein the alkyl radical is selected from the group consisting of ethyl, methyl, 1-propyl and 1-butyl radicals.

5 Claims, No Drawings

ALCL₃/1-ALKYL PYRIDINIUM CHLORIDE ROOM TEMPERATURE ELECTROLYTES

STATEMENT OF GOVERNMENT INTEREST

The invention described herein may be manufactured and used by or for the Government for governmental purposes without the payment of any royalty thereon.

BACKGROUND OF THE INVENTION

This invention relates to fused salt mixtures suitable for use as low temperature battery electrolytes and to a method for their preparation. More particularly, this invention concerns itself with $AlCl_3$/1-Alkyl pyridinium room termperature molten salt mixtures and their use as low temperature primary or secondary battery electrolytes.

The recent interest in developing lightweight power sources for airborne military and emergency applications has generated a considerable materials research effort in an attempt to find new and more efficient component parts for electrochemical power supplies. One particular area of concern has been the use of fused salt mixtures as electrolytes. Generally, such mixtures are solid at room temperature and require the use of a heat activating means in order to melt the electrolytes and activate the battery. Unfortunately, certain electrochemical couples are relatively unstable at these high temperatures, and this limits or eliminates their use in a battery system.

With this invention, however, it has been found that $AlCl_3$/1-Alkyl pyridinium chloride room temperature molten salts are especially useful as an electrolyte for primary and secondary batteries. These salt mixtures are fluid at ambient temperature and their low liquidus temperature, light insensitivity, and electrochemical window are characteristics that render these materials especially useful as low temperature battery electrolytes. This invention provides a molten salt medium that retains the electrochemical properties of present high temperature molten salt systems but without the use to provide and maintain high operating temperatures. It allows for the need of various anode-cathode couples showing excellent primary and secondary battery potentials which cannot be employed in high temperature molten salt systems.

SUMMARY OF THE INVENTION

The present invention concerns itself with fused salt, electrolyte mixtures that are molten at ambient temperatures and suitable for use as an electrolytic medium for low temperature batteries. It is a simplified process that allows for the convenient synthesis of $AlCl_3$/1-alkyl pyridinium chloride room temperature molten salt compositions. The molten salt compositions are prepared by slowly adding the correct stoichiometric amount of aluminum chloride to a 1-alkyl pyridinium chloride using a closed reaction vessel. The alkyl radical of the pyridinium chloride is selected from the group consisting of methyl, ethyl, 1-propyl and 1-butyl radicals. The resulting salt mixtures show excellent properties for use in certain electrochemical systems.

Accordingly, the primary object of this invention is to provide a novel mixture of fusible salts that are molten at room temperature rendering them useful as low temperature battery electrolytes.

Another object of this invention is to provide an $AlCl_3$/alkyl pyridinium chloride room temperature molten salt composition for use as a battery electrolyte.

Still another object of this invention is to provide a simplified and convenient process for synthesizing $AlCl_3$/alkyl pyridinium salt compositions.

The above and still another objects and advantages of the present invention will become more readily apparent upon consideration of the following detailed description thereof.

DESCRIPTION OF THE PREFERRED EMBODIMENTS

Pursuant to the above defined objects, the present invention provides novel fused salt mixtures of $AlCl_3$ and 1-alkyl pyridinium chloride which are molten at room temperatures and possess the electrochemical properties that make them especially useful as an electrolytic medium for low temperature operating primary and secondary batteries. The invention is the first known use of an $AlCl_3$/1-alkyl pyridinium chloride salts for use as a battery electrolyte. The salts are synthesized by a simplified process in which the correct stoichiometric amount of aluminum chloride is slowly added to an appropriate 1-alkyl pyridinium salt, such as methyl pyridinium chloride, ethyl pyridinium chloride, 1-propyl pyridinium chloride or 1-butyl pyridinium chloride to form a 2:1 molar ratio fused salt composition that is fluid at ambient temperature. The reaction takes place in a closed vessel and the evolved heat is controlled by periodically placing the reaction vessel in an ice bath. The resulting liquified molten organic salt is then purified by a conventional electrolysis procedure such as that described by V. R. Koch et al, J. Amer. Chem. Soc., 98, 5277, (1976). The use of a closed vessel prevents contamination of the melt during synthesis and purification of these air and water sensitive compounds external of an inert gas filled drybox.

The specific alkyl pyridinium chloride, salts utilized in this invention can be prepared in accordance with the procedure disclosed in copending U.S. Pat. application Ser. No. 826,222 by John C. Nardi, filed of even date herewith. The Aluminum Chloride component (Fluka, A.G. iron free) was used without further purification.

The room temperature molten ionic systems of this invention offer a distinct temperature and conductivity advantage over current low temperature electrolytes now in use. Therefore, higher current densities (A/cm²) and power densities (W/cm²) are attainable with little or no increase in the weight of the electrolyte. These electrolytes also show a low electronic conductivity allowing for the development of higher power density cells. Self-discharge problems found significant in high temperature nonaduqeous electrolytes have been minimized with the development of these room temperature electrolytes. These are the first known room temperature molten salt battery electrolytes. The use of an $AlCl_3$/organic room temperature electrolyte allows for the design of a primary or secondary battery system without the need of an insulating heat source to keep the electrolyte molten, while still retaining the advantages of more conventional molten salt electrolytes. Certain anode and cathode couples showing excellent electrochemical properties can now be used due to the low operating temperature of the electrolytes. Use of these couples is not possible in present, high temperature molten salt electrolytes because of their thermal instability. All presently known ambient temperature high energy content battery systems are either extraordinarily expensive, or are capable of only low current drain. The present electrolyte is encumbered with neither of these negative qualities.

In order to further illustrate the invention, the following example as presented describing in detail the melt preparation of the molten fused salt mixtures.

EXAMPLE 1

The appropriate 1-alkyl pyridinium chloride was weighed into the lower portion of a Schlenk tube apparatus. The correct stoichiometric amount of $AlCl_3$ was loaded into the upper arm of the Schlenk tube to give a 2:1 molar ratio of $AlCl_3$ to pyridinium chloride. When the $AlCl_3$ was slowly added to the 1-alkyl pyridinium chloride, a spontaneous exothermic reaction occurred, resulting in a clear to slightly yellow colored solution. (This reaction became more vigorous as the molecluar weight of the 1-alkyl pyridinium chloride decreased.) The amount of heat released was controlled by placing the reaction vessel periodically in an ice bath. High reaction temperatures produced darkly colored melts which were difficult to purify. After complete addition of the $AlCl_3$, the room temperature melt was heated to approximately 70° C. to expedite dissolution of any remaining solid.

Each melt was purified by the established electrolysis method of V. R. Koch et al referred to heretofore. This procedure was continued for approximately 3 weeks, after which the melt was colorless. The electrolysis was carried out in the original reaction vessel equipped with a modified ground glass stopper with electrical lead-throughs for electrode connections. The use of a closed system was necessary to prevent contamination of the melts during electrolytic purification. A quantity of appropriate $AlCl_3$/1-alkyl pyridinium chloride was evaluated as a potential electrolyte using a cell setup. Considerable variations are allowable in the anode and cathode materials used. The electrochemical setup described below should be considered only one specific example. Standard electrochemical techinques such as rotating and stationary electrode cyclic voltammetry, chronopotentiometry, and chronoamperometry were used to evaluate each couple in the $AlCl_3$/organic room temperature molten salt.

A specific example of a test cell is described in the following example.

EXAMPLE 2

Electrolyte: 20 ml. of purified 2:1 molar ratio $AlCl_3$1-butyl pyridinium chloride was introduced into the cell.

Anode: a 99.995% pure aluminum or glassy carbon rod were either used as a stationary electrode or connected to a Pine Instruments Rotator for use as a rotating disk electrode.

Cathode: 5.0 millimoles of tetrachloro-p-benzoquinone (chloranil) obtained from the Eastman Chemical Co. and purified by recrystallization from ethanol were dissolved in the electrolyte producing a dark red solution.

Reference Electrode: An aluminum wire immersed in the electrolyte and isolated from the bulk of the melt with a fine glass frit.

The cell of Example 2 was maintained at temperatures between 23° and 100° C. and was found to operate effectively as a low temperature electrochemical power source.

From a consideration of the foregoing, it can be seen that the present invention provides a molten salt medium retaining most of the advantageous electrochemical properties of present high temperature molten salt systems but without the need to provide and maintain high operating temperatures. It also allows for the use of various anode-cathode couples showing excellent primary and secondary battery potentials which cannot be employed in high temperature molten salt systems.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A room temperature molten, fused salt electrolytic composition comprising a mixture of; (1) aluminum trichloride and (2) a 1-alkyl pyridinium chloride wherein said alkyl radical is selected from the group consisting of methyl, ethyl, 1-propyl and 1-butyl.

2. A room temperature molten, fused salt electrolytic composition comprising a 2:1 molar ratio mixture of aluminum trichloride and methyl pyridinium chloride.

3. A room temperature molten, fused salt, electrolytic composition comprising a 2:1 molar ratio mixture of aluminum trichloride and ethyl pyridinium chloride.

4. A room temperature molten, fused salt, electrolytic composition comprising a 2:1 molar ratio mixture of aluminum trichloride and 1-propyl pyridinium chloride.

5. A room temperature molten fused salt, electrolytic composition comprising a 2:1 molar ratio mixture of aluminum trichloride and 1-butyl pyridinium chloride.

* * * * *